3,119,880
CONDENSATION OF ALCOHOLS
John Kollar, Wilkinsburg, and Johann Gustav David Schulz, Pittsburgh, Pa., assignors to Gulf Research & Development Company, Pittsburgh, Pa., a corporation of Delaware
No Drawing. Filed May 29, 1961, Ser. No. 113,083
9 Claims. (Cl. 260—642)

This invention relates to the condensation of alcohols to form alcohols of higher molecular weight. More particularly, this invention relates to the condensation of a primary aliphatic alcohol in the presence of a new and improved catalyst for the Guerbet reaction.

The condensation of alcohols containing a methylene group adjacent to the hydroxylated carbon atom in the presence of a catalytic amount of a basic condensation catalyst, such as sodium, sodium or potassium hydroxide or carbonate, or sodium alcoholate to form alcohols of higher molecular weight is generally known as the Guerbet reaction. The principal product of this reaction is an alcohol or mixture of alcohols containing twice the number of carbon atoms of the starting alcohol. Thus, n-butanol is condensed to 2-ethyl-1-hexanol. Similarly, 1-hexanol is condensed to 2-butyl-1-octanol and 1-octanol is condensed to 2-hexyl-1-decanol. Condensation can also occur between the dimer alcohol product and unreacted starting alcohol and also with other alcohols produced by the reaction to provide a series of alcohols of increased molecular weights so long as one of the reactant alcohols contains a methylene group adjacent to the hydroxylated carbon atom. In addition to the higher molecular weight alcohols obtained by the condensation reaction, prior catalysts have also given rise to the formation of substantial amounts of other products including aldehydes, ketones, carboxylic acids and esters thereof.

In accordance with the present invention, the Guerbet reaction is effected in the presence of a catalytic amount of an alkali and a lead salt which is at least partially soluble in the reactant alcohol. By employing a lead salt in combination with an alkali, more efficient conversion to higher molecular weight alcohols, particularly dimer alcohols, can be obtained. In a preferred embodiment, we use a dehydrogenation catalyst in combination with the alkali and the lead salt. A particularly effective catalyst mixture according to our invention consists of a mixture of anhydrous sodium hydroxide, anhydrous potassium hydroxide, lead acetate trihydrate and a nickel dehydrogenation catalyst.

The alcohols which are utilized in the process of the invention are unsubstituted saturated aliphatic primary alcohols with two hydrogen atoms on the carbon atom which is alpha to the hydroxylated carbon atom (so called alpha hydrogens) or mixtures of such aliphatic primary alcohols with primary alcohols having one or no alpha hydrogens. The process of the invention is restricted to the condensation of primary alcohols inasmuch as secondary alcohols with the hydroxyl group in the 2-position react under the conditions of the process to form an unsaturated ketone. The primary alcohols employed are those containing from 2 to 18 carbon atoms, although alcohols having from about 4 to about 12 carbon atoms including both straight and branched-chain alcohols are preferred. Examples of suitable alcohols include ethyl alcohol, n-propyl alcohol, 1-butanol, 3-methyl-1-butanol, 1-hexanol, 5-methyl-1-hexanol, 1-octanol, 3,4-dimethyl-1-hexanol, 3,5-dimethyl-1-hexanol, 4,5-dimethyl-1-hexanol, 3-methyl-1-heptanol, 5-methyl-1-heptanol, 1-decanol, 3-isopropyl-5-methyl-1-hexanol, 1-dodecanol, 1-tridecanol, 1-tetradecanol, 1-pentadecanol, cetyl alcohol, 1-octadecanol and mixtures thereof.

A particularly important source of a branched-chain primary alcohol mixture which can be employed as a starting material in the process of the present invention is obtained by the Oxo process. The "Oxo" process as is known involves the reaction of carbon monoxide, hydrogen and an olefin in the presence of a carbonylation catalyst such as cobalt to produce an aldehyde containing one carbon atom more than the starting olefin. Reaction conditions during the carbonylation reaction include temperatures of about 120° to about 200° C. and pressures of about 1500 to about 4500 pounds per square inch gauge. Hydrogenation of the resultant aldehyde produces the corresponding alcohol. Thus, according to one such process where the olefin feed is a mixture of heptenes prepared by the condensation of mixed butenes with propylene, the Oxo alcohol product is predominantly a mixture of branched-chain primary octyl alcohols. Typical analysis of such an Oxo octyl alcohol mixture which was used in the examples given hereinbelow is as follows:

| Isomer: | Weight percent |
|---|---|
| 3,4-dimethyl-1-hexanol | 20 |
| 3,5-dimethyl-1-hexanol | 30 |
| 4,5-dimethyl-1-hexanol | 30 |
| 3-methyl-1-heptanol } 5-methyl-1-heptanol | 15 |
| Unidentified alcohols | 5 |

As set forth hereinabove, the condensation catalyst comprises a mixture of an alkali and a lead salt, a preferred embodiment thereof also containing a dehydrogenation catalyst. The mixture is preferably non-aqueous. The alkali portion of the catalyst can be an alkali metal or an anhydrous alkali metal hydroxide including the hydroxides of lithium, sodium, potassium, rubidium and cesium and mixtures thereof. The amount of alkali employed is a function of the amount of alcohol employed as charge stock. The molar ratio of alkali to alcohol should be about 1:2 to about 1:20 with a range of about 1:5 to about 1:10 being preferred.

The lead salt employed in the process of the present invention serves as an accelerator. The lead salt can be either an organic or an inorganic salt provided the salt is at least partially soluble in the reaction mixture. Examples of suitable lead salts which can be used in the present process are lead nitrate, lead acetate trihydrate, lead octanoate, lead naphthenate, lead perchlorate, lead beta naphthalene sulfonate, lead oleate, lead phenolsulfonate, lead stearate, etc. The amount of the lead salt employed comprises about 0.01 to about 0.5 mole of lead salt per mole of alkali. In most instances, good results are obtained with about 0.01 to about 0.05 mole of lead salt per mole of alkali.

The dehydrogenation catalyst employed can be any known dehydrogenation catalyst including any of the metals, metal oxides or metal sulfides of copper, nickel, cobalt and iron. Good results are generally obtained with a copper, nickel, cobalt or iron dehydrogenation catalyst, preferably in a reduced state. Best results are obtained with a nickel dehydrogenation catalyst. While reduced copper, nickel, cobalt and iron dehydrogenation catalysts are preferred, it is within the scope of the present invention to employ compounds of such metals, preferably salts, organic as well as inorganic, which during the course of the reaction will be substantially converted to the elemental metal. Examples of suitable dehydrogenation catalysts which can be used in the present process are metallic nickel such as Raney nickel; nickel on kieselguhr; copper chromite; physical mixtures of cobalt and copper; metallic copper; nickel acetate tetrahydrate; nickel octanoate; nickel naphthenate; cobalt acetate tetrahydrate; cobalt octanoate; cobalt naphthenate; iron acetate tetrahydrate; iron octanoate; iron naphthenate; etc. When used, the amount of the dehydrogenation catalyst is a function of the amount of alkali employed. In general, the amount of dehydrogenation catalyst comprises about 0.1 to about 4 moles of dehydrogenation catalyst per mole of alkali. In most instances, good results are obtained with about 0.25 to about 1 mole of dehydrogenation catalyst per mole of alkali. A preferred range when using nickel on kieselguhr with anhydrous sodium and/or potassium hydroxide is about 0.3 to about 0.5 mole of nickel per mole of the hydroxide.

The aforesaid mixture of alkali, lead salt and dehydrogenation catalyst can be used in any catalytic amount. Preferably the amount of the mixture will be about 5 to about 20 percent by weight based on the weight of the alcohol. The quantity of catalyst employed will be dependent to some extent upon the particular alcohol or mixture of alcohols being condensed as well as upon the reaction temperature, pressure, time and other variables known to those skilled in the art.

The optimum temperature employed in the process of the invention will vary with the alcohol charged. Generally, the present process can be carried out effectively at the reflux temperature of the alcohol being treated. While a temperature as low as about 80° C. can be used and satisfactory results will be obtained, it is preferred to employ a temperature of at least about 100° C. at atmospheric pressure in order to remove the water of reaction substantially as fast as it is formed. Such removal of water is beneficial for high conversions and yields. The upper temperature limit is the temperature at which thermal breakdown of the alcohol charge or product begins to occur. This limit is generally about 350° to about 400° C. In general, however, a refluxing temperature of about 150° to about 240° C. at the autogenous pressure of the reactant mixture is considered most satisfactory.

Generally, the present process can be carried out effectively at atmospheric pressure. However, if the boiling point of the alcohol being treated is below the optimum reaction temperature, the reaction can be carried out in a confined system in which case a pressure as high as about 250 pounds per square inch gauge, preferably no higher than about 100 pounds per square inch gauge, can be used. In any event, the pressure should be sufficient to keep the reactants in the liquid phase. If the reaction is carried out at an elevated pressure in a confined system care should be exercised to remove from the reaction area substantially all of the water formed during the course of the reaction in order to obtain desired high conversions and yields.

The time required for the reaction is not particularly critical and can be varied as desired although it should be sufficiently long to insure obtaining an appreciable conversion of the alcohol to the dimer product but not so long as to allow further condensation to form trimers and tetramers. In general, a reflux time of about 5 minutes to about 24 hours or more is adequate although best results are obtained with a period of about 0.5 to about 3 hours at optimum temperatures, pressure, and catalyst concentration.

The process of this invention can further be illustrated by the following examples:

EXAMPLE I 260 grams (2 moles) of an Oxo octyl alcohol mixture were mixed with 10 grams (0.25 mole) of anhydrous sodium hydroxide and 1.5 grams (0.004 mole) of lead acetate trihydrate. The mixture was then rapidly heated to 165° C. and refluxed at that temperature for about 9 hours. In the course of the reaction, water was removed substantially as fast as it was formed. The reaction mass was cooled, acidified with phosphoric acid and filtered. The liquid product was then washed twice with distilled water. The washed product was then fractionated. A fraction amounting to 54.3 percent of the products recovered consisted predominantly of higher alcohols. 69.6 percent of the starting alcohol was converted, resulting in an efficiency of 78.0 percent.

EXAMPLE II 260 grams (2 moles) of an Oxo octyl alcohol mixture were mixed with 10 grams (0.085 mole of Ni) of nickel on kieselguhr, 10 grams (0.25 mole) of anhydrous sodium hydroxide and 3.0 grams (0.008 mole) of lead acetate trihydrate. The mixture was then rapidly heated to 165° C. and refluxed at that temperature for about 3 hours. In the course of the reaction, water was removed substantially as fast as it was formed. The reaction mass was cooled, acidified with phosphoric acid and filtered. The liquid product was then washed twice with distilled water. The washed product was then fractionated whereupon 60.3 percent of higher alcohols were recovered. 73.5 percent of the starting alcohol was converted, resulting in an efficiency of conversion to higher alcohols of 82.0 percent.

EXAMPLE III 260 grams (2 moles) of an Oxo octyl alcohol mixture were mixed with 10 grams (0.085 mole of Ni) of nickel on kieselguhr, 10 grams (0.25 mole) of anhydrous sodium hydroxide and 5.0 grams (0.013 mole) of lead acetate trihydrate. The mixture was then rapidly heated to 165° C. and refluxed at that temperature for about 1¾ hours. In the course of the reaction, water was removed substantially as fast as it was formed. The reaction mass was cooled, acidified with phosphoric acid and filtered. The liquid product was then washed twice with distilled water. The washed product was then fractionated whereupon 53.1 percent of higher alcohols were recovered. 63.3 percent of the starting alcohol was converted, resulting in an efficiency of conversion to higher alcohols of 83.9 percent.

EXAMPLE IV 260 grams (2 moles) of an Oxo octyl alcohol mixture were mixed with 10 grams (0.085 mole of Ni) of nickel on kieselguhr, 14 grams (0.25 mole) of anhydrous potassium hydroxide and 1.0 gram (0.0026 mole) of lead acetate trihydrate. The mixture was then rapidly heated to 165° C. and refluxed at that temperature for about 2¼ hours. In the course of the reaction, water was removed substantially as fast as it was formed. The reaction mass was cooled, acidified with phosphoric acid and filtered. The liquid product was then washed twice with distilled water. The washed product was then fractionated whereupon 72.4 percent of higher alcohols were recovered. 81.3 percent of the starting alcohol was converted, resulting in an efficiency of conversion to higher alcohols of 89.1 percent.

EXAMPLE V 260 grams (2 moles) of an Oxo octyl alcohol mixture were mixed with 14 grams (0.25 mole) of anhydrous potassium hydroxide, 10 grams (0.085 mole of Ni) of nickel on kieselguhr and 5.0 grams (0.013 mole) of lead acetate trihydrate. The mixture was then rapidly heated to 165° C. and refluxed at that temperature for about 2½ hours. In the course of the reaction, water was removed substantially as fast as it was formed. The reaction mass was cooled, acidified with phosphoric acid and filtered. The liquid product was then washed twice with distilled water. The washed product was then fractionated whereupon 71.3 percent of higher alcohols were recovered. 78.5 percent of the starting alcohol was converted, resulting in efficiency of conversion to higher alcoholds of 90.8 percent.

EXAMPLE VI 260 grams (2 moles) of an Oxo octyl alcohol mixture were mixed with 10 grams (0.085 mole of Ni) of nickel on kieselguhr, 7.5 grams (0.187 mole) of anhydrous sodium hydroxide, 3.5 grams (0.062 mole) of anhydrous potassium hydroxide and 1.0 gram (0.0026 mole) of lead acetate trihydrate. The mixture was then rapidly heated to 165° C. and refluxed at that temperature for 85 minutes (about 1.42 hours). In the course of the reaction, water was removed substantially as fast as it was formed. The reaction mass was cooled, acidified with phosphoric acid and filtered. The liquid product was then washed twice with distilled water. The washed product was then fractionated whereupon 58.7 percent of higher alcohols were recovered. 68.0 percent of the starting alcohol was converted, resulting in an efficiency of conversion to higher alcohols of 86.3 percent.

In each of the above examples the process was carried out in accordance with the invention in the presence of a small amount of an alkali and a lead salt. In the preferred embodiments, i.e., Examples II, III, IV, V and VI, a nickel on kieselguhr dehydrogenation catalyst was also employed. The following examples illustrate the results obtained when the lead salt either is omitted from the catalyst mixture, i.e., Examples VII and VIII, or is used in an amount below its effective amount, i.e., Example IX. Thus, Examples VII, VIII and IX are not embodiments of the invention. They are included merely for the sake of comparison.

EXAMPLE VII 260 grams (2 moles) of an Oxo octyl alcohol mixture were mixed with 10 grams (0.25 mole) of anhydrous sodium hydroxide. The mixture was then rapidly heated to 165° C. and refluxed at that temperature for about 9 hours. During this time no water was formed. The reaction mass was cooled, acidified with phosphoric acid and filtered. The liquid product was then washed twice with distilled water. Upon distillation of the product, 100 percent was recovered as the starting alcohol thus indicating that no condensation to higher alcohols had occurred.

EXAMPLE VIII 260 grams (2 moles) of an Oxo octyl alcohol mixture were mixed with 10 grams (0.085 mole of Ni) of nickel on kieselguhr and 10 grams (0.25 mole) of anhydrous sodium hydroxide. The mixture was then rapidly heated to 165° C. and refluxed at that temperature for about 3½ hours. In the course of the reaction, water was removed substantially as fast as it was formed. The reaction mass was cooled, acidified with phosphoric acid and filtered. The liquid product was then washed twice with distilled water. The washed product was then fractionated whereupon 48.0 percent of higher alcohols were recovered. 65.8 percent of the starting alcohol was converted resulting in an efficiency of conversion to higher alcohols of 72.9 percent.

EXAMPLE IX

The procedure of Example VIII was repeated except that 0.5 gram (0.0013 mole) of lead acetate trihydrate was employed in combination with the nickel on kieselguhr and the anhydrous sodium hydroxide. Upon fractionation of the washed product the results were substantially the same as that obtained in fractionating the product of Example VIII. While the higher alcohols amounted to 51.2 percent, the acid and residue totaled 17.7 percent.

A summary of the results obtained in the above examples is presented in Table I.

*Table I*

| Example No. | Nickel on Kieselguhr, gms. | Alkali, moles | Lead Acetate, moles | Moles of Lead Acetate, per mole of Alkali | Reaction Time, Hours | Composition of Products, Wt. Percent | | | | Conversion, Percent | Efficiency, Percent |
|---|---|---|---|---|---|---|---|---|---|---|---|
| | | | | | | Unreacted $C_8$ Alcohols | $C_{16}$ Alcohols | Acid | Residue | | |
| I | | 0.25 NaOH | 0.004 | 0.016 | 9.0 | 30.4 | [1]54.3 | 10.6 | 4.7 | 69.6 | 78.0 |
| II | 10 | 0.25 NaOH | 0.008 | 0.032 | 3.08 | 26.5 | 60.3 | 3.6 | 9.6 | 73.5 | 82.0 |
| III | 10 | 0.25 NaOH | 0.013 | 0.052 | 1.75 | 36.7 | 53.1 | 3.4 | 6.8 | 63.3 | 83.9 |
| IV | 10 | 0.25 KOH | 0.0026 | 0.01 | 2.25 | 18.7 | 72.4 | 3.0 | 5.9 | 81.3 | 89.1 |
| V | 10 | 0.25 NOH | 0.013 | 0.052 | 2.5 | 21.5 | 71.3 | 2.5 | 4.7 | 78.5 | 90.8 |
| VI | 10 | {0.187 NaOH, 0.062 KOH} | 0.0026 | 0.01 | 1.42 | 22.0 | 58.7 | 3.2 | 6.1 | 68.0 | 86.3 |
| VII | | 0.25 NaOH | | | 9.0 | 100 | | | | | |
| VIII | 10 | 0.25 NaOH | | | 3.5 | 34.2 | 48.0 | 6.3 | 11.5 | 65.8 | 72.9 |
| IX | 10 | 0.25 NaOH | 0.0013 | 0.005 | 3.5 | 31.1 | 51.2 | 6.2 | 11.5 | 68.9 | 74.3 |

[1] Predominantly $C_{16}$ alcohols but also containing a small amount of aldehydes.

The data summarized in Table I clearly show the improvement obtained when a lead salt is employed in combination with an alkali catalyst in the Guerbet reaction. It will be noted from Example I that a 69.6 percent conversion was obtained with a 78 percent efficiency when 0.004 mole of lead acetate was used in combination with 0.25 mole of sodium hydroxide. While some aldehydes were present in the $C_{16}$ alcohol fraction, the conversion, nevertheless, was infinitely better than that obtained in Example VII where no lead salt was used. It will be noted from Examples II to VI which represent preferred embodiments of the invention that good conversion to $C_{16}$ alcohols is obtained and that the efficiency of the conversion to $C_{16}$ alcohols is between 82 and 91 percent when a small amount of a dehydrogenation catalyst is employed in combination with the alkali and the lead salt. In order to show the importance of employing a lead salt in an amount corresponding to at least about 0.01 mole per mole of alkali, Example IX was conducted with only 0.005 mole of lead salt per mole of alkali. It will be noted by comparing Examples VIII and IX that substantially the same result was obtained using 0.005 mole of lead acetate per mole of alkali in combination with 10 grams of nickel on kieselguhr that was obtained when no lead salt was used. While there was a slight improvement in the conversion to $C_{16}$ alcohols in Example IX, the total acid and residue remained about the same as in Example VIII.

While our invention has been described with reference to various specific examples and embodiments, it will be understood that the invention is not limited to such examples and embodiments and may be variously practiced within the scope of the claims hereinafter made.

We claim:
1. A process which comprises condensing an unsubstituted saturated aliphatic primary alcohol containing from 2 to 18 carbon atoms having two hydrogen atoms on the carbon atom which is alpha to the hydroxylated carbon atom to form an alcohol containing twice the number of carbon atoms of the starting alcohol, at a temperature of about 100° C. to about 400° C. at a pressure to keep the reactants in the liquid phase, in the presence of about 5 to about 20 percent by weight based on the weight of the alcohol of a mixture of an anhydrous alkali metal hydroxide, lead acetate and nickel on kieselguhr, wherein the mole ratio of the alkali metal hydroxide to the starting alcohol is about 1:2 to about 1:20, the mole ratio of lead acetate to the alkali metal hydroxide is about 0.01:1 to about 0.5:1 and the mole ratio of nickel to the alkali metal hydroxide is about 0.1:1 to about 4:1.

2. A process which comprises condensing an unsubstituted saturated aliphatic primary alcohol containing from 2 to 18 carbon atoms having two hydrogen atoms on the carbon atom which is alpha to the hydroxylated carbon atom to form an alcohol containing twice the number of carbon atoms of the starting alcohol, at a refluxing temperature of about 150° C. to about 240° C. and at the autogenous pressure of the reactant mixture, in the presence of about 5 to about 20 percent by weight based on the weight of the alcohol of a mixture of anhydrous sodium hydroxide, lead acetate and nickel on kieselguhr, wherein the mole ratio of sodium hydroxide to the starting alcohol is about 1:2 to about 1:20, the mole ratio of lead acetate to sodium hydroxide is about 0.01:1 to about 0.5:1 and the mole ratio of nickel to sodium hydroxide is about 0.1:1 to about 4:1.

3. A process which comprises condensing an unsubstituted saturated aliphatic primary alcohol containing from 2 to 18 carbon atoms having two hydrogen atoms on the carbon atom which is alpha to the hydroxylated carbon atom to form an alcohol containing twice the number of carbon atoms of the starting alcohol, at a refluxing temperature of about 150° C. to about 240° C. and at the autogenous pressure of the reactant mixture, in the presence of about 5 to about 20 percent by weight based on the weight of the alcohol of a mixture of anhydrous potassium hydroxide, lead acetate and nickel on kieselguhr, wherein the mole ratio of potassium hydroxide to the starting alcohol is about 1:2 to about 1:20, the mole ratio of lead acetate to potassium hydroxide is about 0.01:1 to about 0.5:1 and the mole ratio of nickel to potassium hydroxide is about 0.1:1 to about 4:1.

4. A process which comprises condensing an Oxo octyl alcohol mixture to form an alcohol mixture of predominantly $C_{16}$ alcohols, at a refluxing temperature of about 165° C., in the presence of about 5 to about 20 percent by weight based on the weight of the alcohol of a mixture of anhydrous sodium hydroxide, lead acetate and nickel on kieselguhr, wherein the mole ratio of sodium hydroxide to Oxo octyl alcohol is about 1:5 to about 1:10, the mole ratio of lead acetate to sodium hydroxide is about 0.01:1 to about 0.05:1 and the mole ratio of nickel to sodium hydroxide is about 0.3:1 to about 0.51.

5. A process which comprises condensing an Oxo octyl alcohol mixture to form an alcohol mixture of predominantly $C_{16}$ alcohols, at a refluxing temperature of about 165° C., in the presence of about 5 to about 20 percent by weight based on the weight of the alcohol of a mixture of anhydrous potassium hydroxide, lead acetate and nickel on kieselguhr, wherein the mole ratio of potassium hydroxide to Oxo octyl alcohol is about 1:5 to about 1:10, the mole ratio of lead acetate to potassium hydroxide is about 0.01:1 to about 0.05:1 and the mole ratio of nickel to potassium hydroxide is about 0.3:1 to about 0.5:1.

6. A process which comprises condensing an Oxo octyl alcohol mixture to form an alcohol mixture of predominantly $C_{16}$ alcohols, at a refluxing temperature of about 165° C., in the presence of about 5 to about 20 percent by weight based on the weight of the alcohol of a mixture of anhydrous sodium and potassium hydroxides, lead acetate and nickel on kieselguhr, wherein the mole ratio of the sodium and potassium hydroxides taken together to the Oxo octyl alcohol is about 1:5 to about 1:10, the mole ratio of lead acetate to sodium and potassium hydroxides taken together is about 0.01:1 to about 0.05:1 and the mole ratio of nickel to sodium and potassium hydroxides taken together is about 0.3:1 to about 0.5:1.

7. A process which comprises condensing an unsubstituted saturated aliphatic primary alcohol containing from 2 to 18 carbon atoms having two hydrogen atoms on the carbon atom which is alpha to the hydroxylated carbon atom to form an alcohol containing twice the number of carbon atoms of the starting alcohol, at a temperature of about 100° C. to about 400° C. at a pressure to keep the reactants in the liquid phase, in the presence of a catalytic amount of a mixture of (1) a basic condensing agent selected from the group consisting of the alkali metals and their anhydrous hydroxides and (2) a lead salt of an acid selected from the group consisting of nitric, acetic, octanoic, naphthenic, perchloric, naphthalene sulfonic, phenol sulfonic, oleic and stearic acids, wherein the mole ratio of said basic condensing agent to the starting alcohol is about 1:2 to about 1:20 and the mole ratio of the lead salt to said basic condensing agent is about 0.01:1 to about 0.5:1.

8. A process which comprises condensing an unsubstituted saturated aliphatic primary alcohol containing from 2 to 18 carbon atoms having two hydrogen atoms on the carbon atom which is alpha to the hydroxylated carbon atom to form an alcohol containing twice the number of carbon atoms of the starting alcohol, at a temperature of about 100° C. to about 400° C. at a pressure to keep the reactants in the liquid phase, in the presence of a catalytic amount of a mixture of (1) a basic condensing agent selected from the group consisting of the alkali metals and their anhydrous hydroxides, (2) a lead salt of an acid selected from the group consisting of nitric, acetic, octanoic, naphthenic, perchloric, naphthalene sulfonic, phenol sulfonic, oleic and stearic acids and (3) a dehydrogenation catalyst selected from the group consisting of the metals copper, nickel, cobalt and iron, wherein the mole ratio of said basic condensing agent to the starting alcohol is about 1:2 to about 1:20, the mole ratio of the lead salt to said basic condensing agent is about 0.01:1 to about 0.5:1 and the mole ratio of the dehydrogenation catalyst to said basic condensing agent is about 0.1:1 to about 4:1.

9. A process which comprises condensing an unsubstituted saturated aliphatic primary alcohol containing from 2 to 18 carbon atoms having two hydrogen atoms on the carbon atom which is alpha to the hydroxylated carbon atom to form an alcohol containing twice the number of carbon atoms of the starting alcohol, at a temperature of about 100° C. to about 400° C. at a pressure to keep the reactants in the liquid phase, in the presence of about 5 to about 20 percent by weight based on the weight of the alcohol of a mixture of an anhydrous alkali metal hydroxide and lead acetate, wherein the mole ratio of the alkali metal hydroxide to the starting alcohol is about 1:2 to about 1:20 and the mole ratio of the lead acetate to the alkali metal hydroxide is about 0.01:1 to about 0.5:1.

References Cited in the file of this patent

UNITED STATES PATENTS

| | | |
|---|---|---|
| 2,457,866 | Carter | Jan. 4, 1949 |
| 2,836,628 | Miller | May 27, 1958 |
| 2,949,486 | Weesner et al. | Aug. 16, 1960 |

UNITED STATES PATENT OFFICE
CERTIFICATE OF CORRECTION

Patent No. 3,119,880                  January 28, 1964

John Kollar et al.

It is hereby certified that error appears in the above numbered patent requiring correction and that the said Letters Patent should read as corrected below.

Column 4, lines 67 and 68, for "alcoholds" read -- alcohols --; columns 5 and 6, Table I, under the heading "Alkali, moles" and opposite Example No. V, for "0.25 NOH" read -- 0.25 KOH --; column 7, line 48, for "0.51" read -- 0.5:1 --.

Signed and sealed this 16th day of June 1964.

(SEAL)
Attest:

ERNEST W. SWIDER                  EDWARD J. BRENNER
Attesting Officer                   Commissioner of Patents